US008229046B2

(12) United States Patent
Seo et al.

(10) Patent No.: US 8,229,046 B2
(45) Date of Patent: Jul. 24, 2012

(54) FREQUENCY ERROR ESTIMATOR USING SECOND-ORDER LOOP FILTER AND OPERATING METHOD OF THE FREQUENCY ERROR ESTIMATOR

(75) Inventors: Seok Seo, Daejeon (KR); Hyung Jung Kim, Daejeon (KR); Deock Gu Jee, Daejon (KR); Gweon Do Jo, Daejeon (KR); Jin Up Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 838 days.

(21) Appl. No.: 12/256,112

(22) Filed: Oct. 22, 2008

(65) Prior Publication Data

US 2009/0154619 A1  Jun. 18, 2009

(30) Foreign Application Priority Data

Dec. 17, 2007  (KR) .................. 10-2007-0132827

(51) Int. Cl.
*H04B 1/10* (2006.01)
(52) U.S. Cl. ........ 375/346; 375/316; 455/63.1; 455/296
(58) Field of Classification Search .................. 375/346, 375/316; 455/63.1, 296
See application file for complete search history.

(56) References Cited

U.S. PATENT DOCUMENTS

| 6,330,291 B1* | 12/2001 | Agrawal et al. ............... 375/326 |
| 2003/0021247 A1 | 1/2003 | Sendonaris et al. |
| 2003/0054768 A1* | 3/2003 | Challa et al. .................... 455/63 |
| 2005/0239398 A1* | 10/2005 | Lai ................................. 455/3.02 |

FOREIGN PATENT DOCUMENTS

| JP | 10-190613 | 7/1998 |
| KR | 1020010079752 A | 8/2001 |

* cited by examiner

*Primary Examiner* — Chieh M Fan
*Assistant Examiner* — Leila Malek
(74) *Attorney, Agent, or Firm* — Kile Park Goekjian Reed & McManus PLLC

(57) ABSTRACT

A frequency error estimator and an operating method of the frequency error estimator are provided. In the frequency error estimator and the operating method of the frequency error estimator, a frequency error between a transmitter and a receiver of a mobile communication system using a reference code is calculated, thereby improving the precision of estimation while reflecting variations in frequency over time.

9 Claims, 5 Drawing Sheets

FREQUENCY ERROR ESTIMATOR USING SECOND-ORDER LOOP FILTER AND OPERATING METHOD OF THE FREQUENCY ERROR ESTIMATOR

This application claims the benefit of Korean Application No. 10-2007-0132827, filed on Dec. 17, 2007 in the Korean Intellectual Property Office, the disclosure of which is incorporated herein by reference.

BACKGROUND OF THE INVENTION

1. Field of the Invention

The present invention relates to a frequency error estimator, which calculates a frequency error between a transmitter and a receiver of a mobile communication system that uses a reference code and can thus achieve high estimation precision while reflecting variations in frequency over time, and an operating method of the frequency error estimator.

The present invention is based on research (Project No.: 2006-S-001-02, Project Title: Development of Adaptive Wireless Access and Transmission Technology for Fourth Generation Mobile communication) conducted as part of Information Technology (IT) Growth Power Technology Development Project launched by Ministry of Information and Communication and Institute for Information Technology Advancement (IITA).

2. Description of the Related Art

In general, a receiver in a mobile communication system uses a synchronous detection method to obtain excellent detection.

A mobile communication system using the synchronous detection method reproduces a carrier wave that is synchronized with the carrier frequency of an input signal, and detects symbols based on the reproduced carrier wave.

However, a frequency error is highly likely to occur between a transmitter and a receiver of a mobile communication system due to the difference between the precision of a local oscillator of the transmitter and the precision of a local oscillator of the receiver and carrier frequency variations caused by temperature variations.

A frequency error between a transmitter and a receiver of a mobile communication system may alter the phase of an input signal and may thus deteriorate the performance of the mobile communication system.

Therefore, it is necessary to develop a frequency error estimator capable of improving the performance of a mobile communication system by compensating for a frequency error so as to realize synchronous properties for a receiver.

SUMMARY OF THE INVENTION

The present invention provides a frequency error estimator, which calculates a frequency error between a transmitter and a receiver of a mobile communication system that uses a reference code and can thus improve the precision of estimation while reflecting variations in frequency over time, and an operating method of the frequency error estimator.

According to an aspect of the present invention, there is provided a frequency error estimator including a correlator which calculates a current correlation value based on an input signal and a reference code; a frequency error detector which calculates a cross-product error based on the current correlation value and a previous correlation value and calculating a frequency error based on the cross-product error and the previous correlation value; and a loop filter which calculates a number of filter coefficients corresponding to the frequency error and performs filtering using the filter coefficients.

According to another aspect of the present invention, there is provided an operating method of a frequency error estimator, the operating method including calculating a current correlation value based on an input signal and a reference code; calculating a cross-product error based on the current correlation value and a previous correlation value and calculating a frequency error based on the cross-product error; and calculating a number of filter coefficients corresponding to the frequency error and performing filtering using the filter coefficients.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF THE INVENTION

The present invention will hereinafter be described in detail with reference to the accompanying drawings in which exemplary embodiments of the invention are shown.

Figure 1:
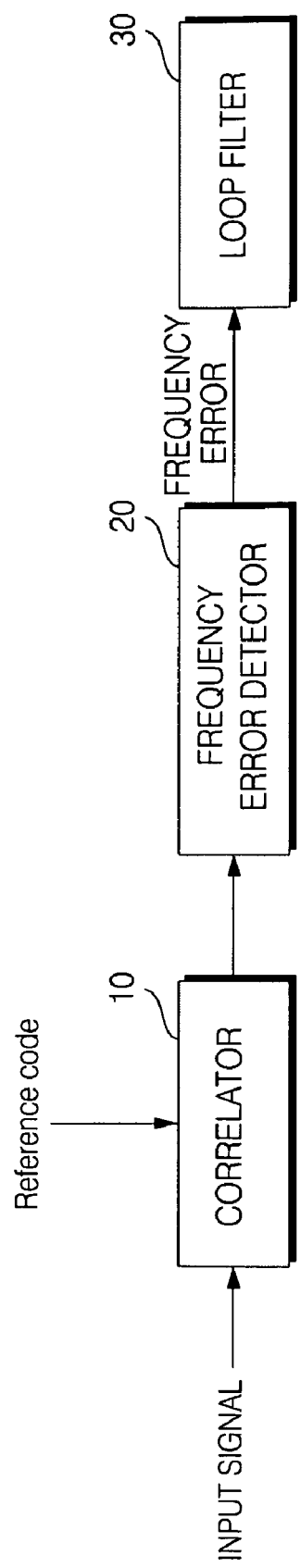
FIG. 1 illustrates a block diagram of a frequency error estimator according to an embodiment of the present invention.

FIG. 1 illustrates a block diagram of a frequency error estimator according to an embodiment of the present invention. Referring to FIG. 1, the frequency error estimator may include a correlator 10, a frequency error detector 20 and a loop filter 30.

The correlator 10 calculates a current correlation value using an input signal and a reference code.

The frequency error detector 20 calculates a cross-product error using the current correlation value and a previous correlation value output by the correlator 10, and calculates a frequency error using the cross-product error and the previous correlation value.

The relationship between the current correlation value and the previous correlation value is represented by Equation (1):

$$y(k)=y(k-1)\exp(j2\pi \Delta f T s) \qquad (1)$$

where y(k) indicates a k-th correlation value output by the correlator 10, y(k−1) indicates a (k−1)-th correlation value output by the correlator 10, $\Delta f$ indicates a frequency error between a transmitter and a receiver, and Ts indicates a sampling interval of the correlator 10. The k-th correlation value y(k) is a complex number that satisfies the following equation: y(k)=i(k)+jq(k) where i(k) indicates a real number and a jq(k) indicates an imaginary number.

The loop filter 30 performs filtering by adjusting the pass band which is determined by the filter coefficient, and thus improves a signal-to-noise ratio (SNR).

Figure 2:
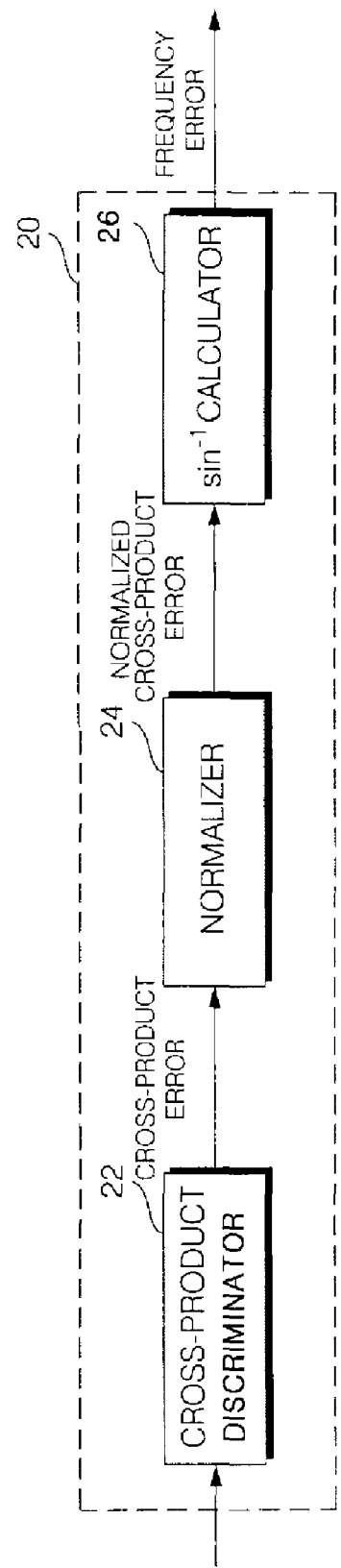
FIG. 2 illustrates a block diagram of an embodiment of a frequency error detector illustrated in FIG. 1.

FIG. 2 illustrates a block diagram of an embodiment of the frequency error detector 20. Referring to FIG. 2, the frequency error detector 20 includes a cross-product discriminator 22, a normalizer 24, and a $\sin^{-1}$ calculator 26.

The cross-product discriminator 22 calculates a cross-product error using a current correlation value and a previous correlation value, which are both output by the correlator 10, and transmits the cross-product error to the normalizer 24.

The normalizer 24 normalizes the cross-product error provided by the cross-product discriminator 22 using the previous correlation value.

The $\sin^{-1}$ calculator 30 calculates a frequency error through the inverse of a sine function.

The operation of the frequency error detector 20 will hereinafter be described in further detail.

First, the cross-product discriminator 22 calculates a cross-product error X based on a current correlation value and a previous correlation value, which are both output by the correlator 10, by multiplying both sides of Equation (1) by a conjugate complex number of the (k−1)-th correlation value y(k−1), as indicated by Equation (2):

$$X=q(k)i(k-1)-i(k)q(k-1)=[y(k-1)]^2 \sin(2\pi\Delta fTs) \quad (2).$$

Thereafter, the normalizer 24 normalizes the cross-product discriminator X as indicated by Equation (3):

$$\sin(2\pi\Delta fTs)=X/[y(k-1)]^2. \quad (3).$$

That is, the normalizer 24 calculates a normalized cross-product error by dividing both sides of Equation (2) by $[y(k-1)]^2$.

Thereafter, the $\sin^{-1}$ calculator 30 calculates a frequency error through the inverse of a sine function, as indicated by Equation (4):

$$2\pi\Delta fTs=\sin^{-1}[X/\{y(k-1)\}^2] \quad (4).$$

That is, the $\sin^{-1}$ calculator 30 calculates a frequency error by multiplying the normalized cross-product error provided by the normalizer 24 by the inverse function of a sine function.

Figure 3:
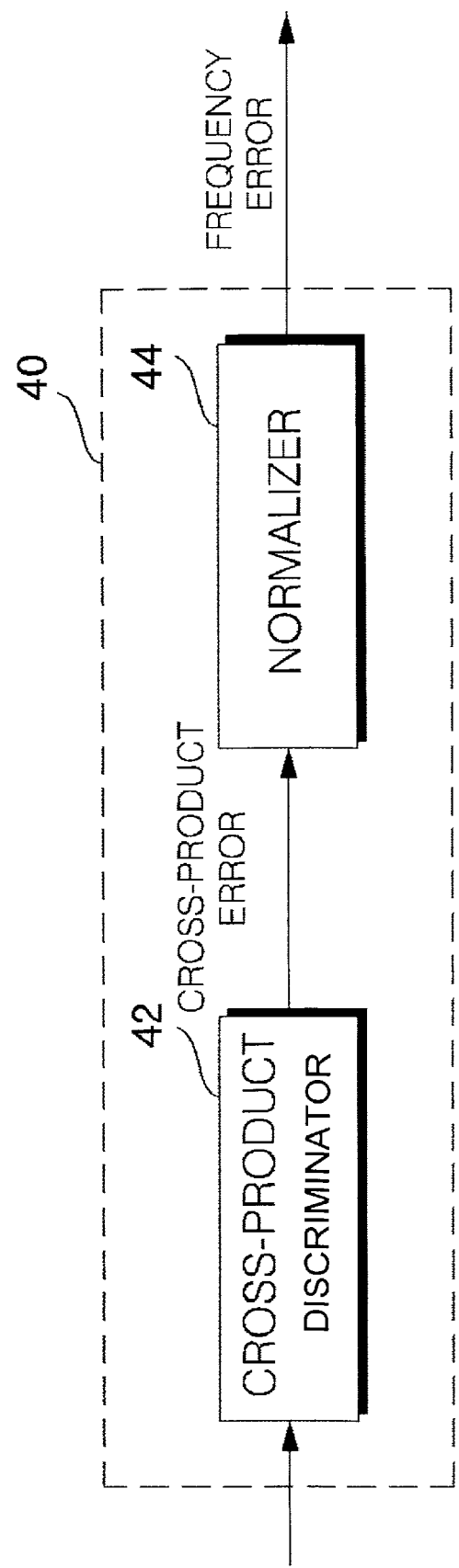
FIG. 3 illustrates a block diagram of another embodiment of the frequency error detector illustrated in FIG. 1.

FIG. 3 illustrates a block diagram of another embodiment of the frequency error detector 20, i.e., a frequency error detector 40. Referring to FIG. 3, the frequency error detector 40 includes a cross-product discriminator 42, which calculates a cross-product error, and a normalizer 44, which normalizes the cross-product error provided by the cross-product discriminator 42 and thus outputs approximated frequency error. The frequency error detector 40 will hereinafter be described in further detail, mainly focusing on the differences with the frequency error detector 20 of the embodiment of FIG. 2.

If $2\pi\Delta fTs \ll 1$, $2\pi\Delta fTs$ of Equation (3) may be approximated as indicated by Equation (5):

$$2\pi\Delta fTs \approx \{q(k)i(k-1)-i(k)q(k-1)\}/[y(k-1)]^2 \quad (5).$$

In this case, the $\sin^{-1}$ calculator 26 is unnecessary, and thus, it is possible to reduce the complexity of computation.

In the embodiment of FIG. 2 or 3, the normalizer 24 or 44 is used. Therefore, it is possible to prevent the performance of the frequency error detector 20 or 40 from being affected by variations in an input signal caused by fading or signal attenuation and thus to prevent the performance of a mobile communication system from being affected by variations in the input signal.

Figure 4:
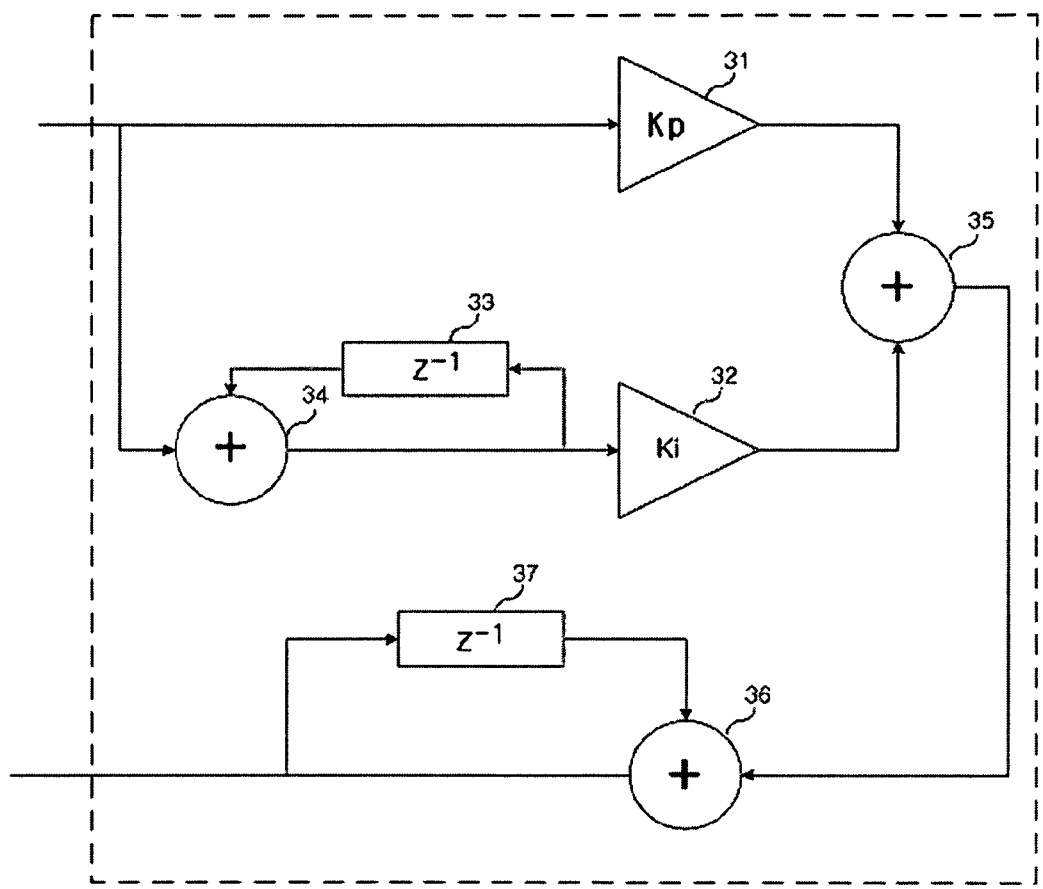
FIG. 4 illustrates a block diagram of a loop filter illustrated in FIG. 1.

FIG. 4 illustrates a block diagram of the loop filter 30. Referring to FIG. 4, the loop filter 30 is used to improve an SNR. The loop filter 30 may be a digital loop filter of second order or higher.

The loop filter 30 may is characterized by two filter coefficients, e.g., filter coefficients Ki and Kp.

The calculation of the filter coefficients Ki and Kp and frequency error gain Kd will hereinafter be described in detail.

The filter coefficients Ki and Kp may be calculated by using Equations (6) and (7):

$$Kp=2\xi\omega nTs/(KvKd) \quad (6)$$

$$Ki=(\omega nTs)2/(KvKd) \quad (7)$$

where $\xi$ indicates a damping vector, $\omega n$ indicates a pass band (rad/sec) of the loop filter 30, and Kv indicates frequency control gain or voltage-controlled oscillator gain.

The frequency error gain Kd may be calculated by approximating a frequency error provided by the frequency error detector 20 to the slope of an S curve, as indicated by Equation (8):

$$Kd=FED\max/(Fs/4) \quad (8)$$

where Fs indicates a sampling frequency of a frequency error detection signal input to the loop filter 3, and FEDmax indicates a frequency error output value when a frequency error is Fs/4.

Once the frequency error gain Kd is determined in the above-mentioned manner, the filter coefficients Kp and Ki may be calculated using the frequency error gain Kd and using Equations (6) and (7).

By using the normalizer 24 in the frequency error detector 20, since the slope of an S curve is maintained regardless of variations in an input signal over time, the frequency error gain Kd, which is approximated to the slope of an S-curve, can be uniformly maintained regardless of variations in the input signal over time. Therefore, the performance of a mobile communication system can be prevented from being affected by variations in the input signal over time, and the filter coefficients Kp and Ki of the loop filter 30 can be easily calculated.

Referring to FIG. 4, the loop filter 30 includes three adders, 34 through 36.

A filter coefficient Kp (31) and Ki (32) may be calculated based on the frequency error gain Kd by using Equation (6) and (7) respectively.

Figure 5:
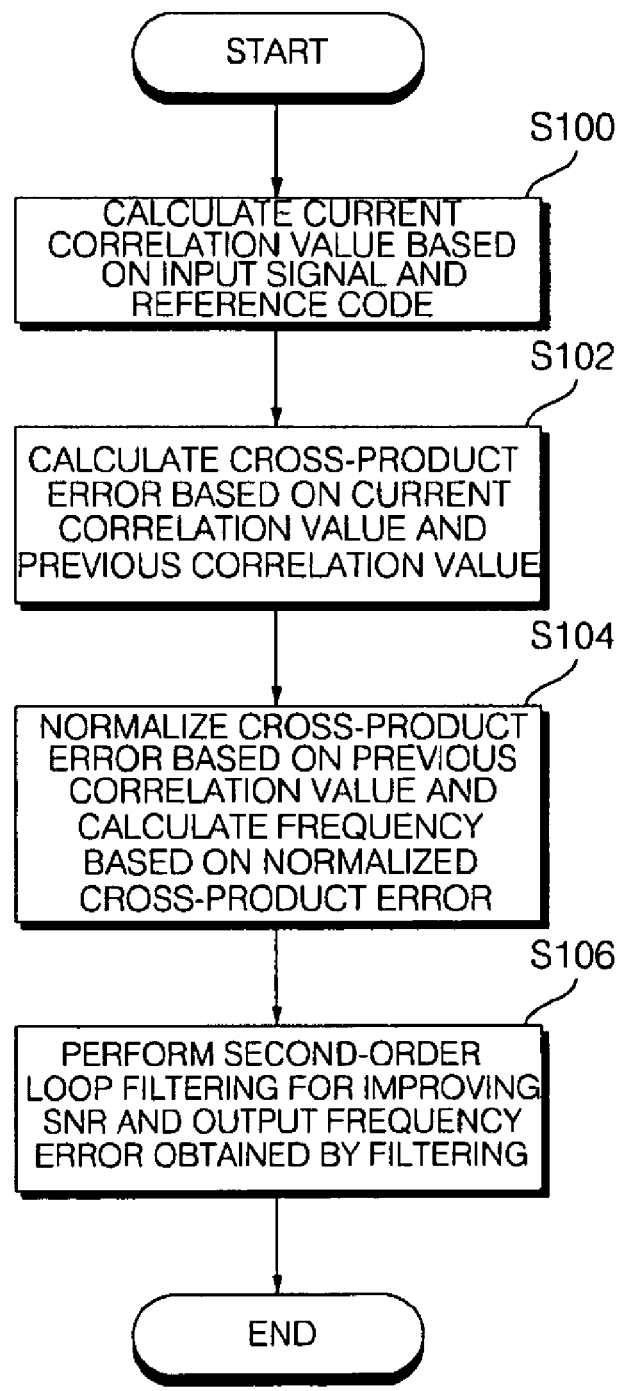
FIG. 5 illustrates a flowchart of an operating method of a frequency error estimator according to an embodiment of the present invention.

FIG. 5 illustrates a flowchart of an operating method of a frequency error estimator according to an embodiment of the present invention. Referring to FIG. 5, the correlator 10 calculates a current correlation value between an input signal and a reference code and outputs the current correlation value (S100).

The cross-product discriminator 22 of the frequency error detector 20 calculates a cross-product error based on the current correlation value and a previous correlation value provided by the correlator 10 (S102).

The normalizer 24 normalizes the cross-product error provided by the cross-product discriminator 22 by using the previous correlation value, thereby obtaining a normalized cross-product error (S104).

The loop filter 30 calculates an estimated frequency error with an improved SNR by adjusting a pass band and performing filtering with the use of the filter coefficients Kp and Ki (S106).

As described above, according to the present invention, it is possible to provide a high precision of estimation while reflecting variations in frequency over time. In addition, it is possible to prevent the performance of a mobile communication system from being affected by variations in an input signal by normalizing the output of a frequency error detector to a signal previously input to the frequency error detector.

Moreover, it is possible to improve SNR by using a digital loop filter of second order or higher.

Furthermore, it is possible to easily determine the number of filter coefficients of a loop filter by using a normalizer.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A frequency error estimator comprising:
    a correlator which calculates a current correlation value based on an input signal and a reference code;
    a frequency error detector which calculates a cross-product error based on the current correlation value and a previous correlation value and calculating a frequency error based on the cross-product error and the previous correlation value; and
    a loop filter which performs filtering and thus gives SNR (signal-to-noise ratio) improvement,
    wherein the frequency error detector includes a normalizer which normalizes the cross-product error based on the previous correlation value,
    wherein the frequency error detector further comprises:
    a cross-product discriminator which calculates the cross-product error; and
    a $\sin^{-1}$ calculator which calculates the frequency error based on the normalized cross-product error.

2. The frequency error estimator of claim 1, wherein the $\sin^{-1}$ calculator calculates the frequency error by inverse of a sine function.

3. The frequency error estimator of claim 1, wherein the frequency error detector comprises:
    a cross-product discriminator which calculates the cross-product error;
    a normalizer which provides the calculated frequency error by normalizing the cross-product error to the previous correlation value.

4. The frequency error estimator of claim 1, wherein the loop filter coefficients are calculated based on a slope of an S curve.

5. The frequency error estimator of claim 4, wherein a pass band is determined by adjusting the loop filter coefficients.

6. The frequency error estimator of claim 1, wherein the loop filter is a digital loop filter of second order or higher.

7. A method for compensating for a frequency error between a transmitter and a receiver of a communication system, the method comprising:
    calculating, by a correlator, a current correlation value based on an input signal and a reference code;
    calculating a cross-product error based on the current correlation value and a previous correlation value and calculating a frequency error based on the cross-product error;
    normalizing the cross-product error based on the previous correlation value to produce a normalized cross-product error; and
    performing filtering by a loop filter characterized by filter coefficients which are calculated using a slope of an S curve,
    wherein the calculating the frequency error comprises:
    calculating the frequency error based on the normalized cross-product error by using an inverse of a sine function.

8. The method of claim 7, wherein the performing filtering comprises:
    calculating frequency error gain based on the frequency error; and
    calculating the filter coefficients based on the frequency error gain and adjusting a pass band.

9. The method of claim 8, wherein the calculating the frequency error gain comprises calculating the frequency error gain using the slope of the S curve.

* * * * *